Aug. 2, 1966   A. M. DONOFRIO   3,264,160
METHOD FOR FABRICATING ASSEMBLIES OF FOAMED PLASTIC
Filed March 26, 1962   4 Sheets-Sheet 5
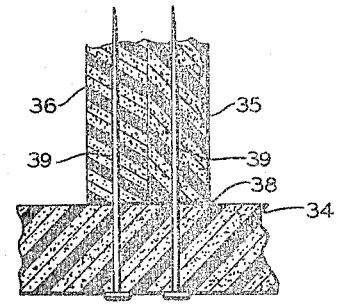
Fig. 12. OLD
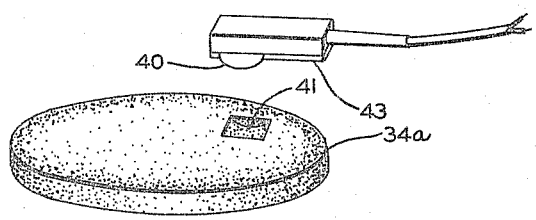
Fig. 12. NEW
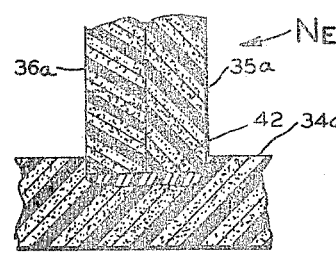
Fig. 13.
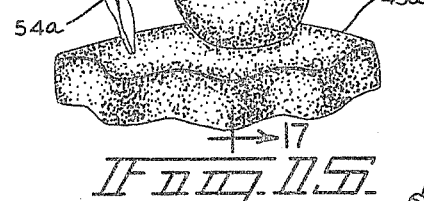
Fig. 15.
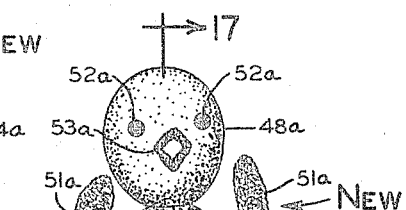
Fig. 14. OLD
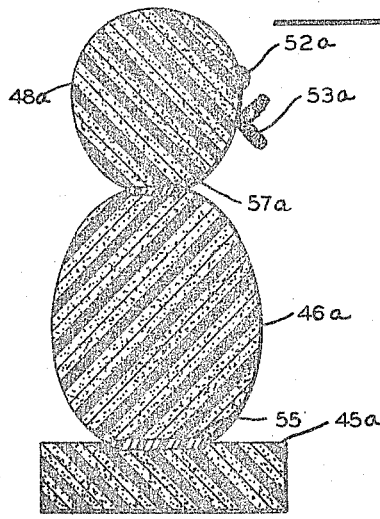
Fig. 17. NEW
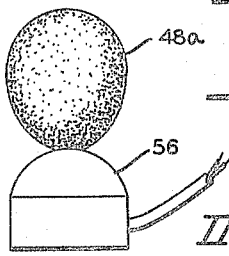
Fig. 16.
INVENTOR.
ALFONSO M. DONOFRIO
BY
Owen & Owen
ATTORNEYS

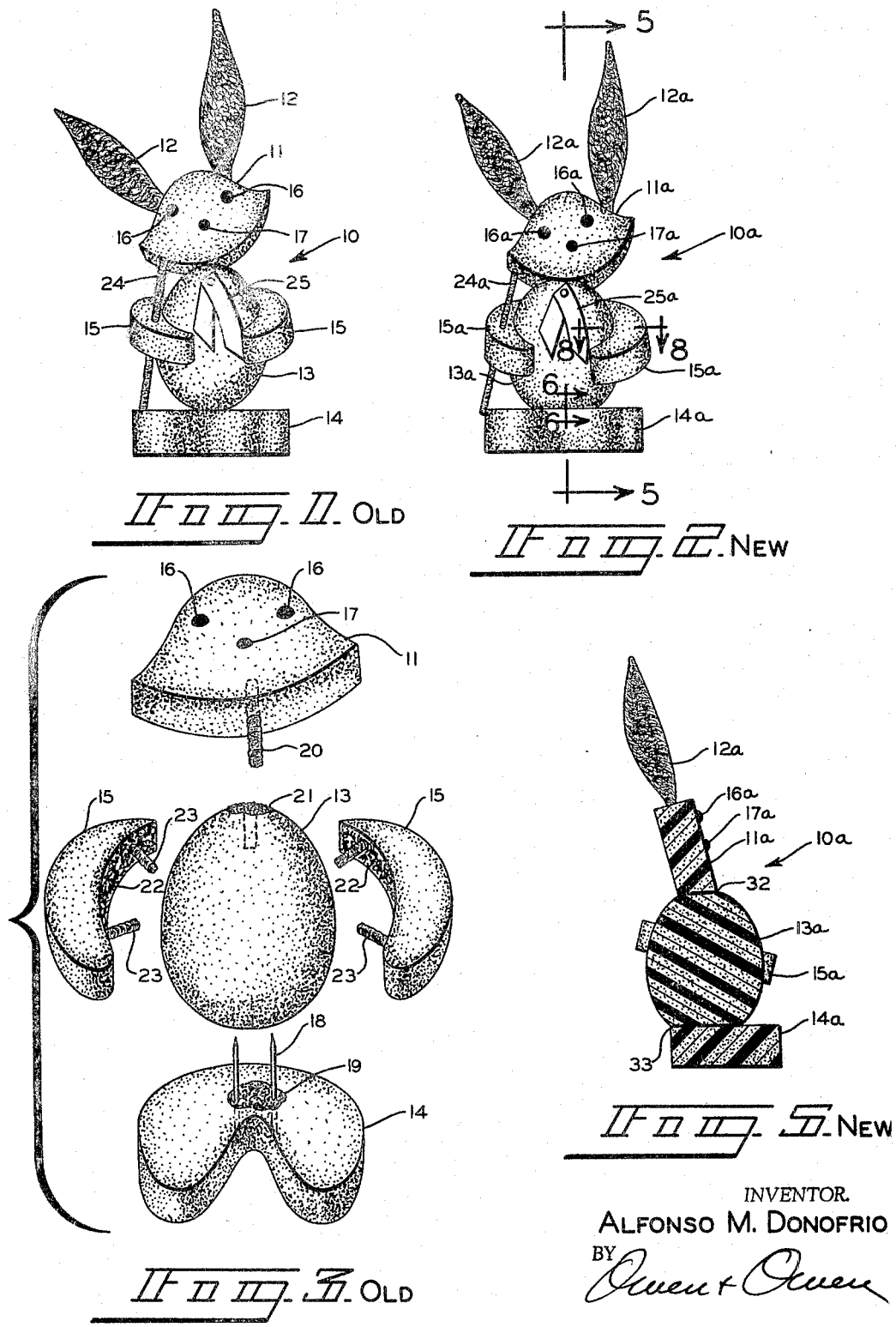

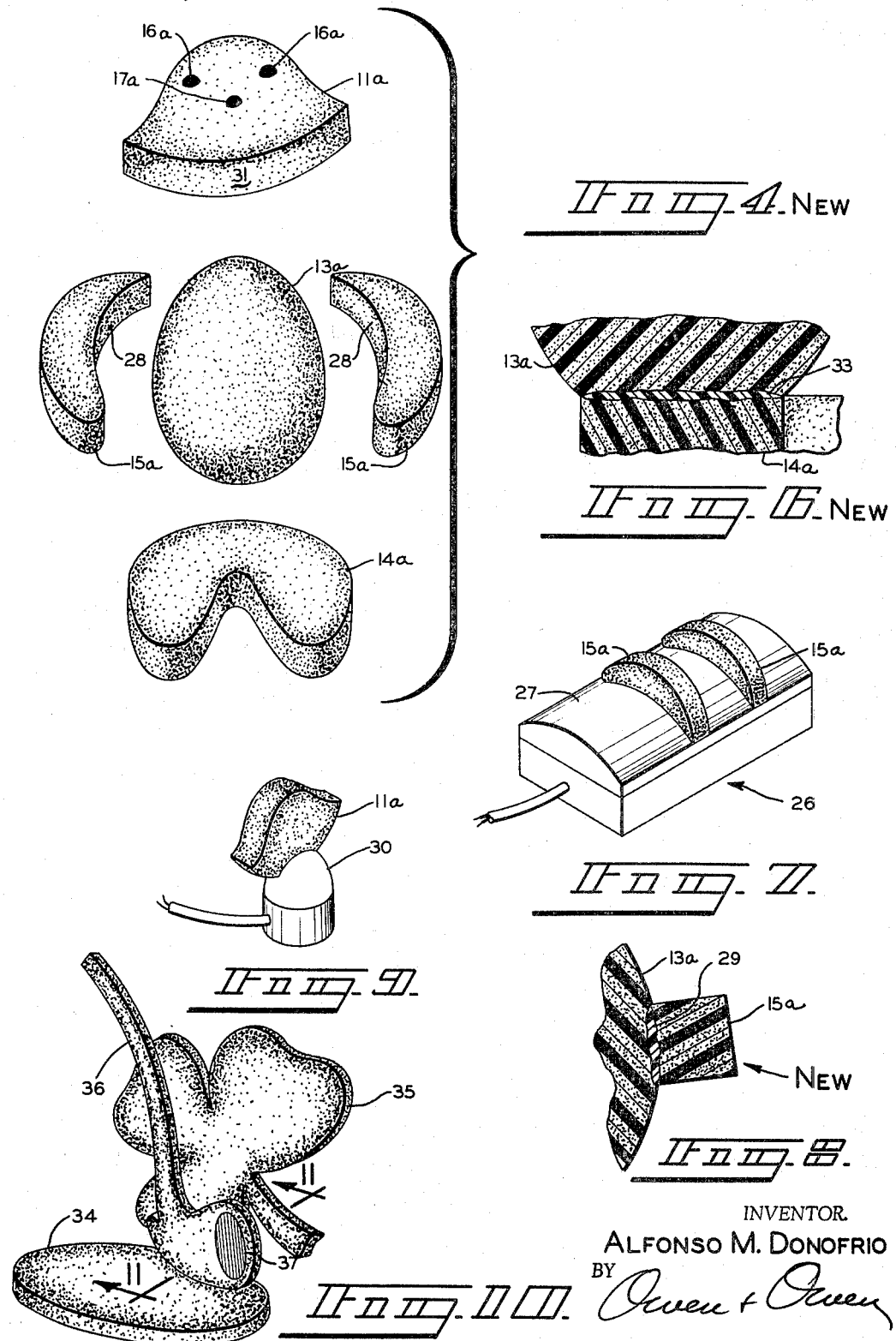

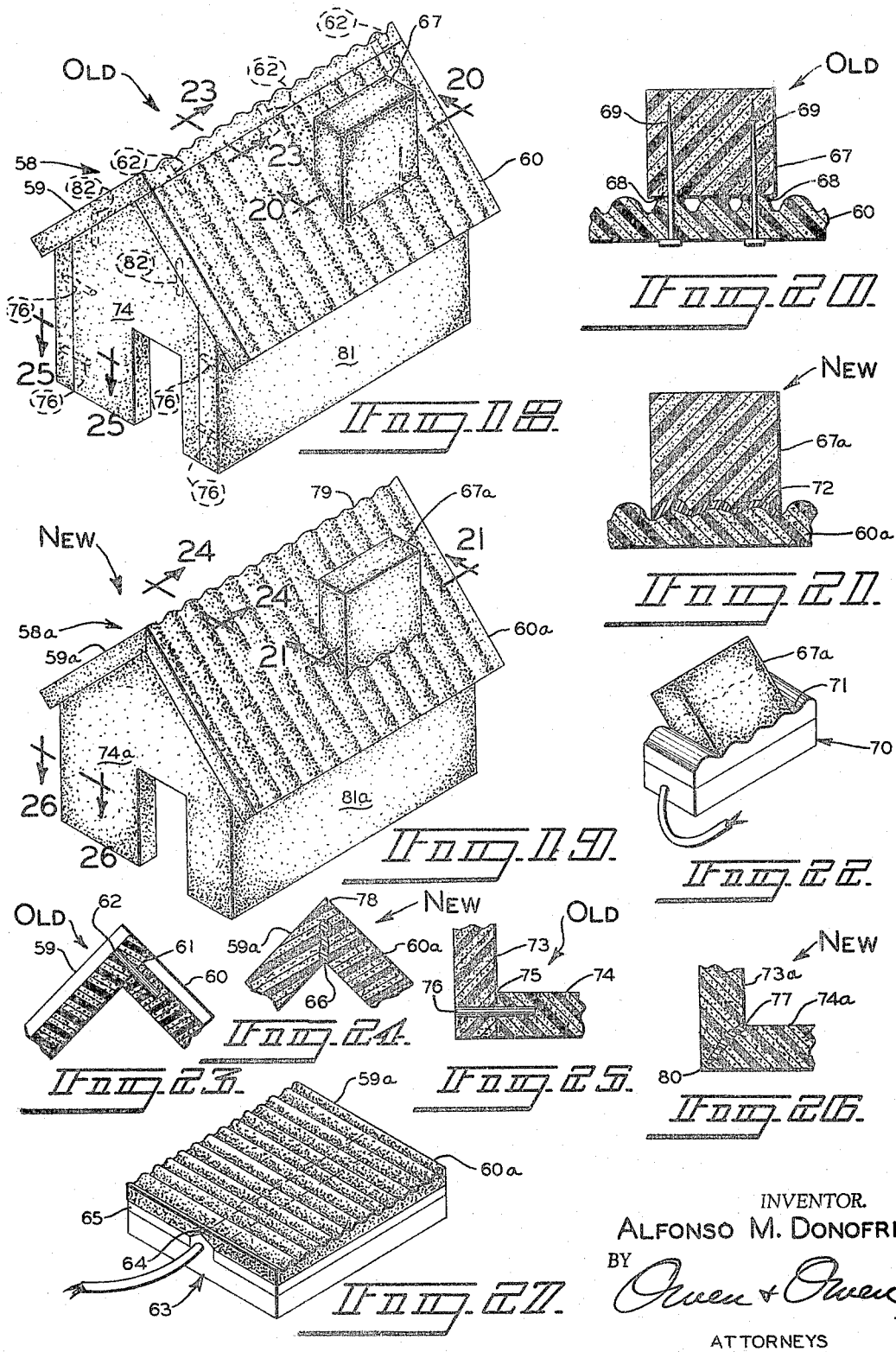

United States Patent Office 3,264,160
Patented August 2, 1966

3,264,160
METHOD FOR FABRICATING ASSEMBLIES OF FOAMED PLASTIC
Alfonso M. Donofrio, 1828 Parkside Blvd., Toledo, Ohio
Filed Mar. 26, 1962, Ser. No. 182,272
2 Claims. (Cl. 156—306)

This invention relates to a method for fabricating assemblies of pieces of foamed resinous material, particularly foamed polystyrene resin; such assemblies including, for examples, toys, advertising specialties, commercial display pieces, packages and packings, boxes, etc., wherein each assembly comprises a number of pieces.

It has been conventional in fabricating assemblies of foamed resin pieces to attach the pieces to each other by the use of adhesives with joints often being reinforced by metal pins or thin rods of wood such as toothpicks, or inserted pieces of so-called chenille of which pipe cleaner lengths are an example. This known method for fabricating assemblies of foamed polystyrene resin pieces has a serious disadvantage in that the adhesives employed require considerable periods of time for drying. As a result, in an assembly line, a very large number of the assembled figures or display pieces must be stored for periods up to twenty-four hours in order that the adhesive will adequately dry so that the pieces will be firmly connected to each other and will not come apart during subsequent shipment and handling.

Assemblies of the type with respect to which the instant invention constitutes an improved method are those made from profiled and three-dimensionally shaped or cut pieces of polystyrene foam. Polystyrene foam melts at about 180° F., the plastic liquifying and collapsing the cells of the foam when exposed to heat above its melting point or when placed in contact with a hot surface.

I have discovered that by engaging even one of a pair of surfaces which are to be placed in contact with each other, with a hot iron at a temperature substantially in excess of the melting temperature of the foamed polystyrene resin and for a very short period of time, a controlled portion of the surface of the foamed resin mass can be melted and liquified and will remain liquid for a period of time long enough to allow two pieces to be welded together under firm pressure.

I make no claim to have discovered the fact that foamed polystyrene resin will melt at about 180° F. but I do claim to have discovered the unexpected fact that if a piece of the foamed polystyrene resin is held in contact with an iron at a temperature much higher than its known melting point and for a very short period of time, only a small depth of the plastic at the surface in contact with the iron will melt and that it will liquify to an extent such that it can then be immediately pressed into contact with another piece of the foamed polystyrene resin and the liquified surface portion of the heated piece will penetrate into the surface interstices of the cool piece, forming a weld or permanent bond between the two pieces.

It is, therefore, the principal object of the instant invention to provide a method for fabricating assemblies of foamed polystyrene resin wherein the use of adhesives and strengthening pins, dowls or rods are both eliminated.

It is yet another object of the instant invention to provide a method for fabricating assemblies of foamed polystyrene resin wherein two pieces to be joined are welded to each other by very rapidly fusing a portion of the surface area of at least one piece and immediately pressing the fused surface area into contact with the surface of the piece to which it is to be joined thereby flowing the liquified resin into intimate bonding contact with the second piece.

A still further object of the instant invention is to provide a method for fabricating assemblies of foamed polystyrene resin pieces wherein a first profiled or contoured piece of polystyrene foamed resin is quickly heated and its surface contours modified by heating and fusion not only to provide for a liquid surface portion but also to modify its shape to provide for mating of the piece being heated with another piece to which it is to be bonded in an assembly.

These and other more specific objects and advantages of a method embodying the invention will be better understood from the specification which follows and by reference to the drawings in which:

FIG. 1 is a front view in elevation of a stylized figure consisting of an assembly of pieces of foamed polystyrene resin and fabricated according to the prior art;

FIG. 2 is a view similar to FIG. 1 but illustrating a similar stylized figure fabricated from identical parts but in accordance with the teachings of the instant invention;

FIG. 3 is an exploded view on an enlarged scale showing the profiled and contoured pieces of foamed polystyrene resin from which the figure illustrated in FIG. 1 is assembled and illustrating the assembly means employed, according to the prior art;

FIG. 4 is a view similar to FIG. 3 but showing the parts necessary to fabricate the same stylized figure according to the method of the instant invention;

FIG. 5 is a vertical sectional view, taken along the line 5—5 of FIG. 2;

FIG. 6 is a fragmentary, detailed, vertical sectional view, taken along the line 6—6 of FIG. 2 and being shown on a greatly enlarged scale;

FIG. 7 is a fragmentary view in perspective of a contoured heating iron utilized for treating two of the parts of the assembled stylized figure illustrated in FIG. 2 according to the teachings of the instant invention;

FIG. 8 is a fragmentary, vertical sectional view, taken along the line 8—8 of FIG. 2, and being shown on a greatly enlarged scale;

FIG. 9 is a fragmentary view in perspective showing yet another type of iron utilized for assembling parts of the stylized figure according to the invention;

FIG. 10 is a view in perspective illustrating a commercial display piece fabricated from profiled pieces of foamed polystyrene resin and comprising a base and backing piece for the display of an article of merchandise;

FIG. 11 is a fragmentary, vertical sectional view, taken along the line 11—11 of FIG. 10, and illustrating the method of assembly of the parts of the display illustrated in FIG. 10 according to the prior art, being shown on a greatly enlarged scale;

FIG. 12 is a fragmentary view in perspective illustrating the treatment of one of the pieces of the assembled display of FIG. 10 according to the teachings of the instant invention;

FIG. 13 is a view similar to FIG. 11 but illustrating the assembly of the parts of the display of FIG. 10 according to the invention;

FIG. 14 is a front view in elevation of a stylized assembly of toy identical to that shown in FIG. 15 but assembled according to the teachings of the prior art;

FIG. 15 is a view in perspective of another stylized toy or figurine assembled according to the teachings of the instant invention;

FIG. 16 is a fragmentary view in elevation illustrating a step in the assembly of the toy of FIG. 15 according to the instant invention;

FIG. 17 is a vertical sectional view, taken along the line 17—17 of FIG. 15 and illustrating the assembly of the stylized figure according to the principles of the instant invention;

FIG. 18 is a view in perspective of a toy house constructed from foamed polystyrene sheet and block material according to the prior art and illustrating the method of assembling right angle and other corners of sheets of the material;

FIG. 19 is a view in perspective of a toy house like that shown in FIG. 18 but assembled according to the instant invention;

FIG. 20 is a fragmentary vertical sectional view taken along the line 20—20 of FIG. 18 and shown on an enlarged scale;

FIG. 21 is a fragmentary vertical sectional view similar to FIG. 20 but taken along the line 21—21 of FIG. 19;

FIG. 22 is a view in perspective of an iron utilized in the assembly of the parts of the house of FIG. 19 which are illustrated in FIG. 21;

FIG. 23 is a fragmentary vertical sectional view taken along the line 23—23 of FIG. 18;

FIG. 24 is a fragmentary vertical sectional view taken along the line 24—24 of FIG. 19;

FIG. 25 is a horizontal sectional view taken along the line 25—25 of FIG. 18;

FIG. 26 is a view similar to FIG. 25 but taken along the line 26—26 of FIG. 19; and FIG. 27 is a view in perspective showing an iron utilized in the formation of right angle miters for the right angle assembly of two sheet-like pieces of foamed polystyrene material according to the instant invention.

A stylized figure of an "Easter Bunny" is generally indicated in FIG. 1 by the reference number 10. This figure comprises a flat, profiled head piece 11 cut from a foamed polystyrene resin sheet, say one-half inch thick. The head piece 11 is decorated with a pair of ears 12 which are fluffy chenille sticks similar to the chenille sticks used for conventional pipe cleaners but, of course, having threads much longer and cut to give the ear pieces 12 the shape illustrated in FIG. 1. The head piece 11 is assembled to the upper end of an egg-shaped body piece 13 and the body piece 13 in turn assembled upon a flat, profiled base or foot piece 14. Two arm pieces 15 are roughly contoured to the exterior of the body piece 13 and assembled therewith to complete the major components of the "Easter Bunny" 10. Eyes 16 and a nose 17 formed from small metallic buttons are impressed into the surface of the head piece 11. The foot piece 14 and arm pieces 15 are profiled from sheet material, say one-half inch thick.

According to the prior art and to the methods of fabricating and assembly employed throughout the industry, in at least so far as I am aware, the foamed polystyrene resin pieces making up the "Easter Bunny" 10 are assembled to each other in the manner illustrated in FIG. 3. A staple 18 is driven upwardly through the foot piece 14 with two points protruding upwardly. A small dab of suitable adhesive 19 is placed upon the foot piece 14 adjacent the prongs of the staple 18 and the body piece 13 is thrust downwardly onto the staple 18, placing the base of the body piece 13 in contact with the adhesive 19. A short length of chenille stick 20 is dipped in adhesive and thrust downwardly into the upper end of the body piece 13 and similarly into the bottom edge of the head piece 11 and a similar dab of adhesive 21 is spread around the upper end of the body piece 13 so that the chenille stick 20 holds the body piece 13 and head piece 11 together while the adhesive 21 is drying.

A layer of adhesive 22 is spread on the inner surface of each of the arm pieces 15 and short chenille sticks 23 are inserted in the arm pieces 15 which are then squeezed against the body piece 13 from opposite sides. The assembly is then set aside for the adhesive in the dabs 19 and 21 and in the layers 22 to dry usually for a period of say twenty-four hours. After drying the assembly worker thrusts the lower ends of the two chenille ears 12 into the upper surface of the head piece 11. In the figure shown, a chenille stick is inserted through one of the arms 15 as a cane 24 for a masculine "Easter Bunny." A fold of ribbon may afterwards be secured as a necktie 25 to the throat portion of the body piece 13.

According to the teachings of the instant invention and in sharp contrast to the assembly method just described according to the prior art, an identical stylized "Easter Bunny" 10a is illustrated in FIGS. 2, 4 and 5. The "Easter Bunny" 10a again is assembled from a head piece 11a, ears 12a, a body piece 13a, a foot piece 14a and arm pieces 15a. The major assembly pieces are, again decorated with eyes 16a and a nose 17a and with a cane 24a and a necktie 25a.

According to the improved method for fabricating assemblies of foamed polystyrene resin embodying the invention, the assembled "Easter Bunny " 10a is fabricated without the use of any mechanical assembly means such as the staple 18, the chenille sticks 20 or 23 or the adhesive dabs 19 and 21 or adhesive layers 22.

In FIG. 7 there is shown an electrically heated iron generally indicated at 26 which has a contoured heated surface 27, so shaped as to conform to the curvature of inner surfaces 28 of arm pieces 15a. I have discovered that if the profiled arm pieces 15a are held in contact with the heated surface 27 of the iron 26, at proper temperature and for appropriately short periods of time, the surfaces 28 of the arm pieces 15a will fuse to form a thin liquid coating which will effectively bond to the cool surface of the body piece 13a when pressed in contact therewith. For example, with the contoured iron surface 27 at a temperature of 450° F. the two arm pieces 15a are pressed against the surface with light manual pressure so that their inner contoured surfaces 28 are firmly in contact with the iron 27 for a period of say one second. During this time the operator feels the softening of the inner surfaces 28 of the arm pieces 15a as the cellular foamed structure of the polystyrene resin collapses under heat. Contact at this temperature and for this short time results in fusing the inner surfaces 28 of the arm pieces 15a and liquifying the plastic from the collapsing cell walls. The operator immediately presses the arm pieces 15a against the surface of the body piece 13a. The hot fused resin on the inner surfaces 28 of the arm pieces 15a partially melts the resin on the surface of the body piece 13a to form a fused, welded junction generally indicated by the reference number 29 in FIG. 8.

I have found that if the temperature of the contoured iron 27 is down near the melting point of the polystyrene resin, say in the order of 180–200° F., the foamed cellular structure softens and collapses, badly distorting the shapes of the pieces in contact with the iron and the resin does not melt rapidly enough to provide the hot liquid layer on the inner contoured surfaces 28 before the piece is irreparably damaged. Conversely, if the iron temperature is too high, say in the order of 600° F., the collapse of the surface cells of the polystyrene foam in the arm pieces 15a is so rapid that it is almost impossible for an operator to prevent the pieces from distorting to a degree too great to permit their utilization. The time and temperature of contact of the pieces to be fused with the contoured iron must be so selected that the collapse of the surface cells will be extremely rapid in a very thin layer to form a thin layer of fused liquid resin to serve as the bonding or welding agent and yet not hot enough or for a period of time long enough either to distort and badly damage the piece or to liquify more than a thin surface layer.

Similarly, the head piece 11a is contacted to an appropriately contoured iron 30 shown in FIG. 9 to form a depression in its bottom edge 31 and at approximately the rear center corner of the bottom edge 31 of a contour determined by the heated iron 30 which has a surface matching that of the body portion 13a. Contact of the lower rear portion of the edge 31 of the head piece 11a with the iron 30 may be maintained for a slightly longer period than would ordinarily be employed if the surface merely were to be fused for bonding. The slightly longer contact results not only in fusing the surface by collapse of the cellular structure of the foamed polystyrene resin but also in melting a depression therein which nests or mates with the upper portion of the body portion 13a. As in the case of the assembly of the arm pieces 15a to the body piece 13a, the assembly of the head piece 11a also results in a thin fused layer of the resinous material joining the two pieces one to each other, such fused layer being indicated by the reference number 32 in FIG. 5.

It should be borne in mind, of course, that, as in the case of the arm pieces 15a, the temperature of the iron 30 should be much hotter than that of the melting point of the foamed polystyrene resin so that only a brief contact, say in the order of one to one and one-half seconds need be maintained between the head piece 11a and the iron 30 in order to melt the surface layer for fusion and to melt the depression into the edge 31 of the head piece 11a for mating with the body piece 13a.

The body piece 13a is similarly treated in order to assemble it with the foot piece 14a. In this case, a flat iron (not shown in the drawings) is again maintained at an elevated temperature of, say, in the order of 450° F. and the base of the body piece 13a is held in contact therewith for a period of say one to one and one-half seconds. The convex bottom portion of the egg-shaped body piece 13a is thus fused and flattened so that when it is pressed into contact with the foot piece 14a a thin layer of fused resin, generally indicated by the reference number 33 in FIG. 6, is provided for welding the two pieces 13a and 14a to each other.

The key to successful welding of pieces of foamed polystyrene resin for the purpose of assembling these pieces to fabricate structures such as those being discussed lies in the proper selection of the shape of the irons relative to the pieces and the time and temperature of contact. It is to be observed that in all three of the assemblies thus far described the surface contour of the hot iron is the same as the surface contour of one of the two pieces to be assembled. This results in fusing and preforming the surface of the heated piece to match the surface of the cold piece and thus to insure an over-all surface contact between the fused liquified surface of the heated piece and the surface of the cold piece. The successful welding of the two pieces of foamed polystyrene resin one to the other depends not only upon fusing a thin surface of the piece being heated but also upon assuring a surface contact between the two pieces throughout the fused area or as nearly completely throughout the area as is possible to achieve. If the iron with which the heated piece is contacted does not have the surface contour of the cold piece, only portions of the surface of the heated piece are fused and an insufficient layer of liquid resin is provided to melt the surface of the cold piece and result in the formation of a thin over-all solid resin interlayer between the two pieces.

While the resin interlayers indicated by the reference numbers 29 (FIG. 8), 32 (FIG. 5) and 33 (FIG. 6) are illustrated as being sharply defined at their surfaces, this is not a correct depiction because, of course, there is a degree of intermingling of the liquified resin with the cellular structure of the two pieces being assembled. In other words, the hot liquified resin is not only formed as a surface layer on the heated piece, but also penetrates into the foamed cellular structure of the two pieces breaking down some cellular walls and forming slight protuberances of solidified resin which are mechanically entangled with the remaining cellular wall structures.

A second consideration of importance, of course, is the time and temperature of contact of the piece to be heated and, as mentioned, it must be held at quite a high temperature relative to the melting temperature of the foamed polystyrene resin and for a very short period of time to preclude the complete breakdown of the cellular structure of the heated piece and its undesirable distortion or malformation.

FIG. 10 illustrates a commercial advertising piece comprising a base 34 profiled from a piece of foamed polystyrene resin in the form of a sheet, say one-half inch thick, on which are erected two profiled pieces, viz. a simulated shamrock 35 and a clay pipe 36. The pipe 36 may be decorated with a dark oval, generally indicated by the reference number 37, to give the impression of the bowl of the pipe 36. According to the prior art, display assemblies such as the piece illustrated in FIG. 10 were fabricated by spreading a thin layer of adhesive 38 (see FIG. 11) on the surface of the base 34 then holding the two vertically extending pieces, i.e., the shamrock 35 and the pipe 36, in contact with the adhesive layer 38 and driving a pair of heavy assembly pins 39 upwardly through the base 34 and into the shamrock 35 and pipe 36. As in the case of other prior art assemblies of foamed polystyrene resin pieces, it was then necessary to set the assembly aside to allow the adhesive 38 to dry so that the piece would remain unified.

In contrast, and in accordance with the teachings of the instant invention, a base piece 34a (FIG. 12) is contacted with a contoured iron 40 to fuse and preform a pocket or recess 41 in its upper surface. The contour of the recess 41 is selected to mate with the lower portions of the shamrock 35 and clay pipe 36 so that immediately after the operator has maintained the short contact of the iron 40 with the base piece 34a, a shamrock 35a and a clay pipe 36a (FIG. 13) may be pressed downwardly into the heated recess 40 wherein there is a thin liquid layer 42 of the resin by which the two vertically extended pieces 35a and 36a are bonded and secured to the base 34a. In accordance with the method of assembly of the instant invention, the temperature of the contoured iron 40 is again in the order of 450° F. and the time of contact with the base piece 34a is again in the order of say one to one and one-half or two seconds. Preferably, the iron 40 is provided with a thin insulating layer 43 surrounding its contoured heated portion so as to prevent the flat upper surface of the base piece 34a from being damaged.

FIGURE 14 is an illustration of yet another assembly of foamed polystyrene resin pieces forming a small Easter toy in this case a duckling generally indicated by the reference number 44 which is mounted upon a base 45. FIGURE 14 illustrates the old method of assembly of this structure wherein an egg-shaped body piece 46 is assembled upon a flat base 45 through the use of a staple 47 and a thin layer of adhesive 48 coated on the base 45 around the staple 46. A head 48, again shaped like a smaller egg, is assembled to the body piece 46 by the use of a short length of chenille stick 49 and, again, a thin layer of adhesive 50 coated on the surface of the body piece 46 and head piece 48 where they meet, surrounding the chenille stick 49. The piece is finally decorated, in this case by the addition of short wings 51 formed, for example, from fluffy chenille and by eyes 52, a beak 53 and a group of small flowers 54.

In accordance with the instant invention, a duckling 44a (FIG. 15) may be assembled without the use of adhesive, chenille sticks or staples. An egg-shaped body piece 46a is held against a hot flat iron and then pressed into contact with the upper surface of a flat base 45a. the fused flattened bottom surface of the egg-shaped body piece 46a again forming a weld by reason of the liquified interlayer of resin generally indicated by the reference number 55 in FIG. 17. A smaller egg-shaped head piece 48a is held in contact with a suitably contoured heated iron 56 (see FIG. 16) to fuse a portion of its surface and to mold a depression in the lower portion of the head piece 48a corresponding to the convex upper surface of the body piece 46a. Contact of the bottom of the head piece 48a with the convex, heated surface of the iron 56 fuses the surface thereof and forms, again, a fused, welding interlayer generally indicated by the reference number 57a in FIG. 17.

In FIG. 18 there is illustrated a toy house generally indicated by the reference number 58 constructed according to the teachings of the prior art from sheets of foamed polystyrene material and from a block of foamed polystyrene material. The house 58 has a peaked roof formed from two pieces of sheet material 59 and 60, the upper surface of both pieces being corrugated or fluted in the initial formation of the sheet in order to simulate a tile roof. At the ridge of the roof formed by the two roof pieces 59 and 60 there is a butt joint (illustrated in section in FIG. 23) where it can be seen that the piece 59 is secured to the edge of the piece 60 by a conventional layer of adhesive 61 and a plurality of pins or pegs 62. It should be noted in FIG. 23 that because of the corrugated surface of the pieces 59 and 60, it is impossible to align the corrugations on the two pieces 59 and 60 at the ridge of the roof formed.

In contrast, and in accordance with the teachings of the instant invention, a small house generally indicated by the reference number 58a in FIG. 19 is illustrated as having a roof formed from a single sheet-like piece of foamed polystyrene resin suitably treated, bent and sealed to form both sides 59a and 60a of a roof for the house 58a. The piece of foamed polystyrene sheet material is treated as shown in FIG. 27. An iron generally indicated by the reference number 63 has a heated portion 64 which is peaked in order to form a shape corresponding to the miter which must be formed in the undersurface of the sheet of foamed polystyrene in order for the two roof pieces 59a and 60a to meet at the ridge of the house 58a. The peaked portion 64 is of such height that when a sheet of corrugated polystyrene foam is laid upon an insulating plate 65 flanking the peak portion 64, the top of the heated peak portion reaches only to the base of the corrugations in the sheet of foamed polystyrene. The iron 63 is heated to a temperature in the order of 450° F. and the sheet is pressed downwardly against its surface for a period of about one and one-half to two seconds. This fuses the cellular material, molding, as it were, the heated portion 64 into the sheet of foamed polystyrene resin and collapsing its cellular structure to provide an inverted V-shaped groove therein. The operator then removes the sheet of foamed polystyrene resin and swings its two portions 59a and 60a downwardly toward each other to close the miter formed by the heated iron portion 64 and to weld the corner in a manner illustrated in FIG. 24. The two roof portion pieces 59a and 60a are unified and welded together by an interlayer of fused resin generally indicated by the reference number 66 in FIG. 24 which extends upwardly to the base of the corrugations in the pieces 59a and 60a.

Comparison of FIGS. 20 and 21 even more clearly demonstrates the striking difference between the methods of assembly according to the prior art and according to the instant invention. In the house of the prior art as illustrated in FIG. 18, there is shown a chimney piece 67 which (FIG. 20) has a bevelled end and is mounted on the side of the roof piece 60 by the use of small dabs of adhesive 68 spread on the ridges of several corrugations of the roof piece 60 and a pair of heavy metal pins 69 which are driven upwardly through the roof piece 60 and into the chimney piece 67. In this assembly, the chimney piece 67 does not fit down into the valleys of the corrugations in the roof piece 60 and presents a crude, unfinished appearance to the eye of the viewer.

In contrast, according to the teachings of the instant invention, a chimney piece 67a (FIGS. 19 and 21) is held against an iron 70 (FIG. 22) which has a corrugated surface 71 matching the corrugations thereof of piece 60a. This contact fuses the flat bias cut surface of the piece 67a to mold the surface to the corrugated shape of the iron 71 and to provide a liquid resin layer. As has already been explained, the corrugated surface 71 of the iron 70 is maintained at a temperature much higher than the melting point of the foamed polystyrene resin so as to rapidly fuse its surface without destroying the over-all shape of the piece. The temperature of the iron 70 is maintained at a level in the order of 450° F. and contact of the chimney piece 67a therewith is maintained for a period about one to one and one-half seconds. The operator then presses the chimney piece 67a directly into contact with the corrugations of the roof piece 60a achieving a permanent weld by means of the fused interlayer such as that indicated by the reference number 72 in FIG. 21.

FIGURES 25 and 26 illustrate the manner of forming right angle joints between sheets of foamed polystyrene resin in accordance with the prior art and in accordance with the instant invention. For example, such joints might be formed at the vertical corners of the houses of FIGS. 18 and 19. The formation of joints of this type is also frequently necessary for the fabrication of assemblies which are to serve as packages, such as small boxes, or packing material, such as rectilinearly shaped inserts for cushioning fragile items being shipped, for examples, instruments, cameras, optical equipment, radio and electronic equipment, etc.

According to the prior art two sheets of foamed polystyrene resin 73 and 74 of which the sheet 74 forms the front wall of the house 58 of FIG. 18, are assembled to each other by butt joining with a thin layer of adhesive 75 and a plurality of assembly pegs 76. A joint of this kind is quite weak, being dependent upon the strength of the assembly pegs 76 and upon the adhesion of the layer 75 to the surface portions of the sheets of foamed polystyrene resin 73 and 74.

In contrast, according to the teaching of the instant invention, as illustrated in FIG. 26, such a joint is formed by heating a sheet of foamed polystyrene resin from which will be formed two meeting walls 73a and 74a upon an iron such as the iron 63 illustrated in FIG. 27 to mold and fuse the surfaces of a miter, and then the two wall portions 73a and 74a are swung together to compress a fused interlayer 77 between the faces of the miter cut on the ends of the pieces 73a and 74a.

It should be noted that whenever an angle joint between two sheets of foamed polystyrene resin is fabricated according to the invention, and as is illustrated in FIGS. 24, 26 and 27, the miter formed by the heated peaked portion 64 of the iron 63 should have a depth less than the thickness of the sheet of foamed polystyrene being treated. For example, in FIG. 24, the miter and the fused interlayer 66 extend from the inner corner of the sheets 59a and 60a to a depth only equal to the thickness of the sheets 59a and 60a at the bottom of the corrugations in their upper surfaces, leaving a "hinge" generally indicated by the reference number 78 which forms the peak of the roof where the hills of the corrugations meet each other. In the case of the toy house of FIG. 19, these crescent shaped peaks 78 form a corrugated "ridge" generally indicated by the reference number 79.

Similarly, where a straight corner is to be formed, as is illustrated in FIG. 26, and at the corners of the vertical walls of the house 58a of FIG. 19, the fused interlayer 77 again extends only from the inside of the corner of the two pieces 73a and 74a to a distance some $\frac{1}{16}$ or $\frac{1}{8}$ inch short of the outer corner of the two pieces, leaving, again, a "hinge" indicated in FIG. 26 by the reference number 80.

It is of interest to also note the difference between the methods of the prior art and that of the instant invention in assembling the entire house 58 or 58a, respectively, which can be understood by comparison of FIGS. 18 and 19. In accordance with the prior art after assembly of the roof formed by the two pieces 59 and 60, it is attached to the upper edges of the walls of the house formed by the sheets 73 and 74 and corresponding sheets 81 and a back wall sheet (not shown) by the use of adhesive and vertically extending assembly pins 82 with additional similar pins being driven into the upper edges of the side walls of the house and into the undersurfaces of the roof pieces 59 and 60 around the entire assembly.

In contrast, in assembling the house 58a of FIG. 19 according to the instant invention, all four walls viz. Nos. 73a, 74a, 81a and the rear wall of the house 58a, may be profiled in a flat sheet of foamed polystyrene resin and miters formed therein as explained above, so that all four walls of the house may be folded from a single sheet. The roof consisting of the pieces 59a and 60a is formed from a single sheet (as illustrated in FIG. 27). The preformed roof and wall structures of the house may be attached to each other, again by using the high-heat, short-time method step of the instant invention to fuse a surface layer on the upper edges of the walls of the house and quickly thereafter by pressing these edges into the undersurfaces of the roof pieces 59a and 60a. No iron for the simultaneous heating of the upper edges of the walls of the house 58a is illustrated in the drawings, but, again, it is necessary that the iron be contoured to agree with the undersurfaces of the roof pieces 59a and 60a.

Boxes, packages, containers and packing materials comprising sheets of foamed polystyrene resin assembled to each other for the purpose of enclosing or nesting items readily can be produced in a fashion comparable to the fashion for producing the toy house illustrated in FIG. 19 according to the invention. The angular relationship between the surfaces of a mitering iron such as the iron 63 is established to produce a miter of such angular displacement as to result in a junction between two sheets as desired for the particular part being produced. The height of the heated portion 64 of the iron, as explained, is so selected as to result in the leaving of a thin hinge along the mitered joint such as the hinge parts 78 and 80 of FIGS. 24 and 26, respectively.

Because the surfaces of the pieces of foamed polystyrene resin are actually irregular, having many interstices therein, the term "apparent surface" is employed to designate the general surface of the pieces, ignoring such irregularities.

Having described my invention, I claim:

1. A method for fabricating an assembly of two foamed polystyrene resin pieces, said method comprising engaging the apparent surface of at least one of said pieces with an iron having a heated surface conforming in contour to the apparent surface contour of the other of said pieces in the area of engagement of the assembled pieces, said heated iron surface being maintained at a temperature of from about 250° F. to about 325° F. higher than the melting temperature of said polystyrene resin, maintaining said piece in contact with said heated iron surface for a period only sufficient to fuse the surface of said piece to said contour and to form a liquid resin layer on said piece and, before said liquid resin layer solidifies, pressing said piece into engagement with the other one of said pieces.

2. A method of joining pieces of polystyrene foam comprising the steps of engaging a surface of one of said pieces with a heated iron maintained at a temperature from about 250° F. to about 325° F. higher than the melting temperature of said polystyrene foam, maintaining said surface in contact with said iron for a period of from about one to two seconds, and quickly pressing said surface into engagement with a surface of the other one of said pieces and holding said surfaces in engagement until the melted polystyrene solidifies, thereby bonding said surfaces together.

References Cited by the Examiner
UNITED STATES PATENTS

| | | | |
|---|---|---|---|
| 2,505,647 | 4/1950 | Norris | 156—306 XR |
| 2,767,436 | 10/1956 | Noland et al. | |
| 2,952,578 | 9/1960 | Carlson | 156—306 XR |
| 3,062,698 | 11/1962 | Aykanian | 156—306 |

EARL M. BERGERT, *Primary Examiner.*

W. B. WALKER, C. B. COSBY, *Assistant Examiners.*